United States Patent
Klein et al.

(10) Patent No.: US 12,448,910 B2
(45) Date of Patent: Oct. 21, 2025

(54) MIXER ARRANGEMENT FOR MIXING AN INJECTION MEDIUM INJECTABLE BY AN INJECTOR WITH THE EXHAUST GAS OF AN INTERNAL COMBUSTION ENGINE

(71) Applicants: DEUTZ Aktiengesellschaft, Cologne (DE); Deere & Company, Moline, IL (US)

(72) Inventors: Christoph Klein, Rösrath (DE); Adrian Troeger, Troisdorf (DE)

(73) Assignees: Deutz Aktiengesellschaft, Cologne (DE); Deere & Company, Moline, IL (US)

( * ) Notice: Subject to any disclaimer, the term of this patent is extended or adjusted under 35 U.S.C. 154(b) by 0 days.

(21) Appl. No.: 18/890,896

(22) Filed: Sep. 20, 2024

(65) Prior Publication Data
US 2025/0101899 A1 Mar. 27, 2025

(30) Foreign Application Priority Data

Sep. 22, 2023 (DE) .......................... 102023125730.7
Sep. 22, 2023 (DE) .......................... 202023105668.7

(51) Int. Cl.
| | |
|---|---|
| *F01N 3/28* | (2006.01) |
| *B01F 23/213* | (2022.01) |
| *B01F 25/314* | (2022.01) |
| *B01F 35/40* | (2022.01) |
| *F01N 3/20* | (2006.01) |

(52) U.S. Cl.
CPC ........ *F01N 3/2892* (2013.01); *B01F 23/2132* (2022.01); *B01F 25/3143* (2022.01); *B01F 35/40* (2022.01); *F01N 3/2066* (2013.01); *F01N 2610/02* (2013.01); *F01N 2610/1453* (2013.01)

(58) Field of Classification Search
CPC .. F01N 3/2892; F01N 3/2066; F01N 2610/02; F01N 2610/1453; B01F 35/40; B01F 23/2132; B01F 25/3143
USPC ............................................................ 60/317
See application file for complete search history.

(56) References Cited

U.S. PATENT DOCUMENTS

| | | | |
|---|---|---|---|
| 2016/0201539 A1* | 7/2016 | Tongu ................ | B01D 53/9431 422/171 |
| 2016/0215675 A1* | 7/2016 | Muruganantham .. | B01D 53/944 |
| 2016/0367940 A1* | 12/2016 | Lorenz ................. | F01N 3/2066 |
| 2018/0328250 A1* | 11/2018 | Upadhye ................ | F01N 3/208 |
| 2019/0383194 A1* | 12/2019 | Tummala ............ | B01F 25/3133 |
| 2023/0061888 A1 | 3/2023 | Geant et al. | |

FOREIGN PATENT DOCUMENTS

| | | |
|---|---|---|
| DE | 102022121578 A1 | 3/2023 |
| EP | 3808949 A1 | 4/2021 |

* cited by examiner

*Primary Examiner* — Mark A Laurenzi
*Assistant Examiner* — Kelsey L Stanek
(74) *Attorney, Agent, or Firm* — Davidson Kappel LLC

(57) ABSTRACT

A mixer assembly, for mixing an injection medium with the exhaust gas of an internal combustion engine, including an exhaust gas guide portion having a first threaded hole pattern and an injector attachable to the exhaust gas guide portion and having a mounting hole pattern. The first threaded hole pattern is complementary to the mounting hole pattern. The exhaust gas guide portion has a second threaded hole pattern. The second threaded hole pattern is complementary to the mounting hole pattern.

9 Claims, 8 Drawing Sheets

MIXER ARRANGEMENT FOR MIXING AN INJECTION MEDIUM INJECTABLE BY AN INJECTOR WITH THE EXHAUST GAS OF AN INTERNAL COMBUSTION ENGINE

CROSS REFERENCE TO RELATED APPLICATION

This claims the benefit of German Patent Applications DE 10 2023 125 730.7, filed on Sep. 22, 2023 and DE 20 2023 105 668.7, filed on Sep. 22, 2023 which are hereby incorporated by reference herein.

TECHNICAL FIELD

The present disclosure relates to a mixer arrangement for mixing an injection medium with the exhaust gas of an internal combustion engine.

BACKGROUND

Reactants are introduced into the exhaust gas flow for the after-treatment of exhaust gases, so that environmentally harmful components in the exhaust gas are reduced. In diesel internal combustion engines, for example, a urea-water solution is injected into the exhaust gas in order to reduce the proportion of nitrogen oxide in the exhaust gas in a downstream SCR catalytic converter arrangement. A mixer arrangement can be arranged upstream of the catalytic converter arrangement, which mixes the reactant injected into the exhaust gas flow with the exhaust gas in order to improve the effectiveness of the catalytic converter.

A mixer arrangement for an internal combustion engine is known from EP 3 808 949 A1, comprising: a base element, wherein a reactant input opening is formed in the base element, which is open in the direction of a radially expanding reactant receiving volume. A mounting arrangement is formed on an outer side of the base element, via which a mounting flange of an injector can be fixed to the base element. The mounting arrangement has a flat contact surface for contacting the injector and a plurality of internal threads arranged around the reactant input opening at a circumferential distance from one another. The shape of the contact surface and the positioning of the internal threads are matched to the shape of the mounting flange of the injector.

SUMMARY

An aspect is to provide a mixer arrangement for mixing an injection medium with the exhaust gas of an internal combustion engine, which ensures the function of an injector of the mixer arrangement in different installation positions of the mixer arrangement or the injector.

Accordingly, a mixer arrangement for mixing an injection medium with the exhaust gas of an internal combustion engine is proposed, comprising: an exhaust gas guide section with a first threaded hole pattern, an injector which can be fastened to the exhaust gas guide section and has a mounting hole pattern; wherein the first threaded hole pattern is designed to be complementary to the mounting hole pattern, wherein the exhaust gas guide section has a second threaded hole pattern and the second threaded hole pattern is also designed to be complementary to the mounting hole pattern.

The mixer arrangement has the advantage that the alignment of the injector can be kept constant in different installation positions of the mixer arrangement, in which the mounting hole pattern of the injector is brought into overlap with either the first threaded hole pattern or the second threaded hole pattern. As the injection medium supply line and/or the cooling water lines must be arranged in their horizontal and vertical target alignment for the injector to function fully. For example, the cooling water supply lines and drains must always be directed geodetically upwards (against gravity) to prevent the formation of gas bubbles in the injector. The mixer arrangement can therefore be used in at least two different installation positions.

A hole pattern describes the position of several bores or threaded holes in relation to each other and can also be referred to as a hole pattern. The hole pattern is characterized in particular by the number of holes, the spatial arrangement of the holes and the diameter of the holes.

In one possible embodiment, the exhaust gas guide section can have an injection opening which extends along an injection axis and through which the injection medium can be injected from the injector into the exhaust gas guide section. The second threaded hole pattern can be arranged rotationally symmetrical to the first threaded hole pattern with respect to the injection axis. Due to the rotationally symmetrical arrangement of the first threaded hole pattern and the second threaded hole pattern, two different installation positions of the mixer arrangement can be realized, which result from the rotation of the mixer arrangement around the injection axis. In particular, the second threaded hole pattern can be offset by 180 degrees to the first threaded hole pattern in relation to the injection axis. Alternatively or in combination, the second threaded hole pattern can be arranged symmetrically to the first threaded hole pattern with respect to a plane of symmetry that includes the injection axis.

In one possible embodiment, the injector can have mounting apertures which together form the mounting hole pattern. The exhaust gas guide section can have first threaded holes, which together form the first threaded hole pattern. The exhaust gas guide section can have second threaded holes, which together form the second threaded hole pattern. The injector can be attached to the exhaust duct section using several screws. One of the several screws can extend through one of the mounting apertures of the injector. The multiple screws can each engage in one of the first threaded holes. Alternatively, the multiple screws can each engage in one of the second threaded holes.

In one possible embodiment, the first threaded holes and/or the second threaded holes can each be arranged radially outside the injection opening with respect to the injection axis. The center axes of the first threaded holes can each be arranged in different longitudinal planes that comprises the injection axis. Alternatively or in combination, the center axes of the second threaded holes can each be arranged in different longitudinal planes that comprises the injection axis.

In a further possible embodiment, the injector can have at least three mounting openings, which together form the mounting hole pattern. The exhaust gas guide section can have at least three first threaded holes, which together form the first threaded hole pattern. The center axes of the first three threaded holes can define an imaginary first cylinder with a triangular base face. The exhaust gas guide section can have at least three second threaded holes, which together form the second threaded hole pattern. The center axes of the three second threaded holes define an imaginary second cylinder with a triangular base face. The injection axis can be arranged in the imaginary first cylinder and/or in the imaginary second cylinder.

BRIEF SUMMARY OF THE DRAWINGS

In the following, a possible embodiment of a mixer arrangement is explained in more detail with reference to the figure drawings. Herein

FIG. 7 shows the view from FIG. 4 with the injector screwed on; and

DETAILED DESCRIPTION

Figure 1:
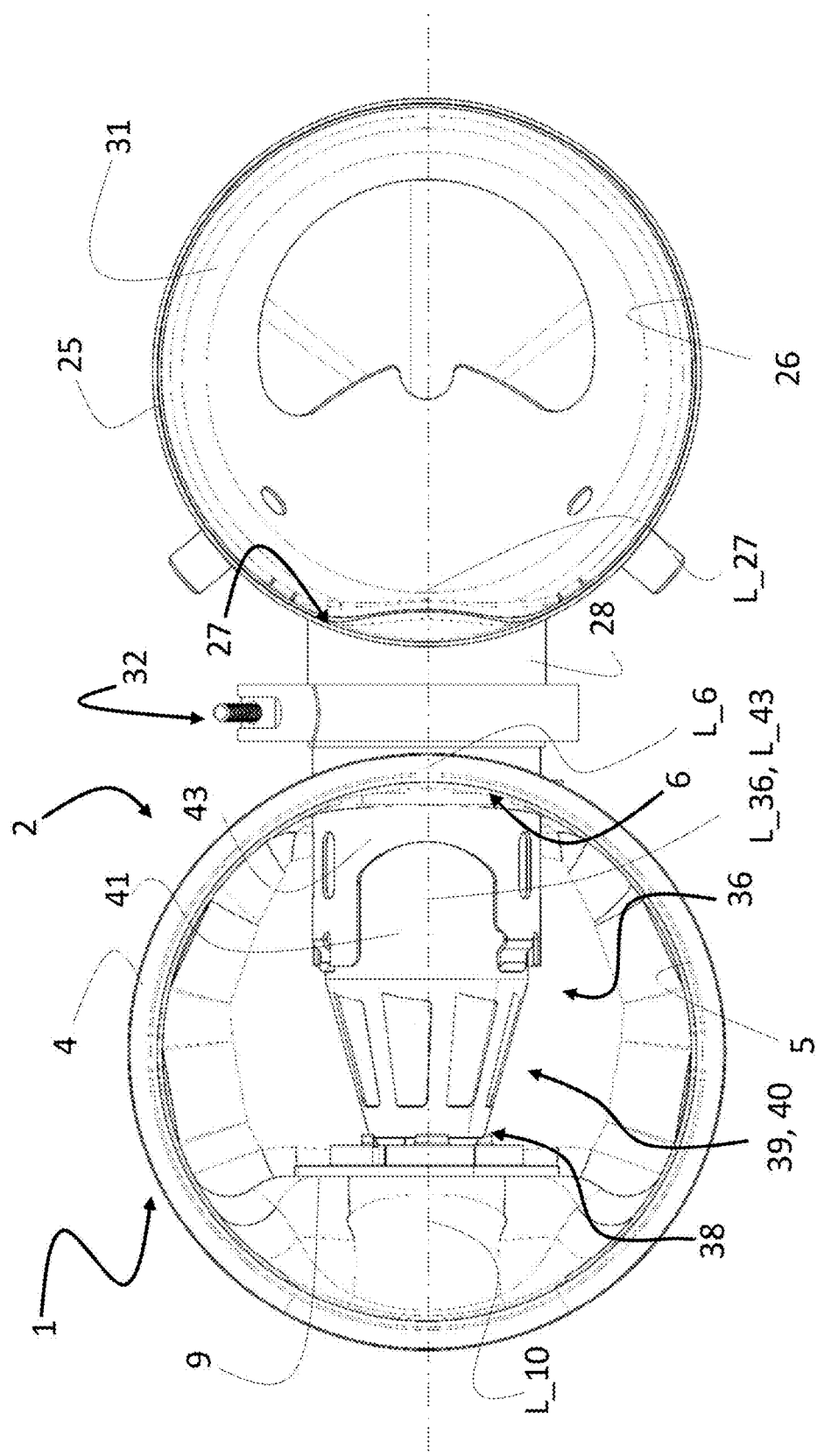
FIG. 1 shows a side view of an exhaust gas aftertreatment arrangement with a mixer arrangement.
Figure 2:
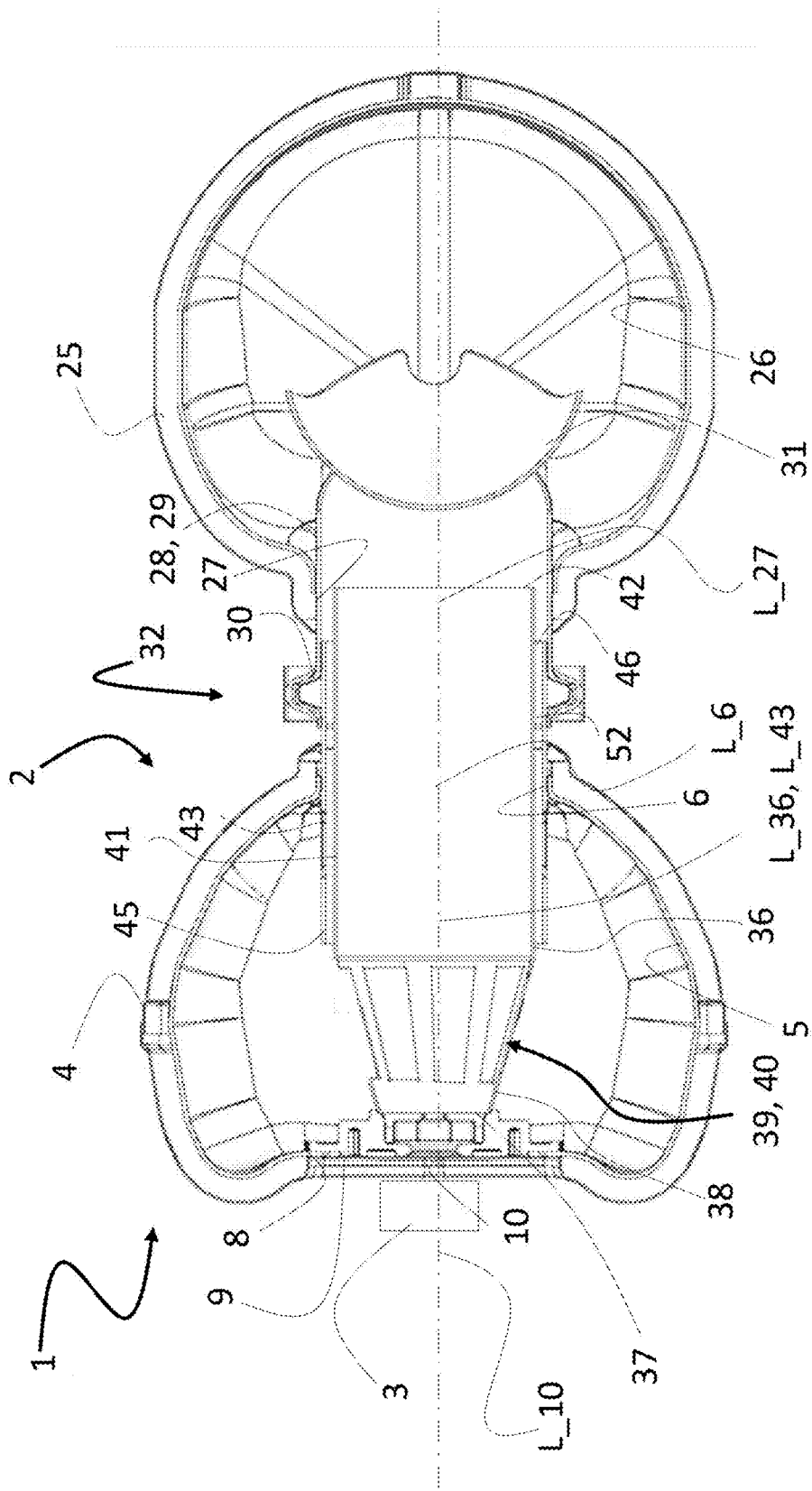
FIG. 2 shows a longitudinal section through the mixer arrangement from FIG. 1.
Figure 3:
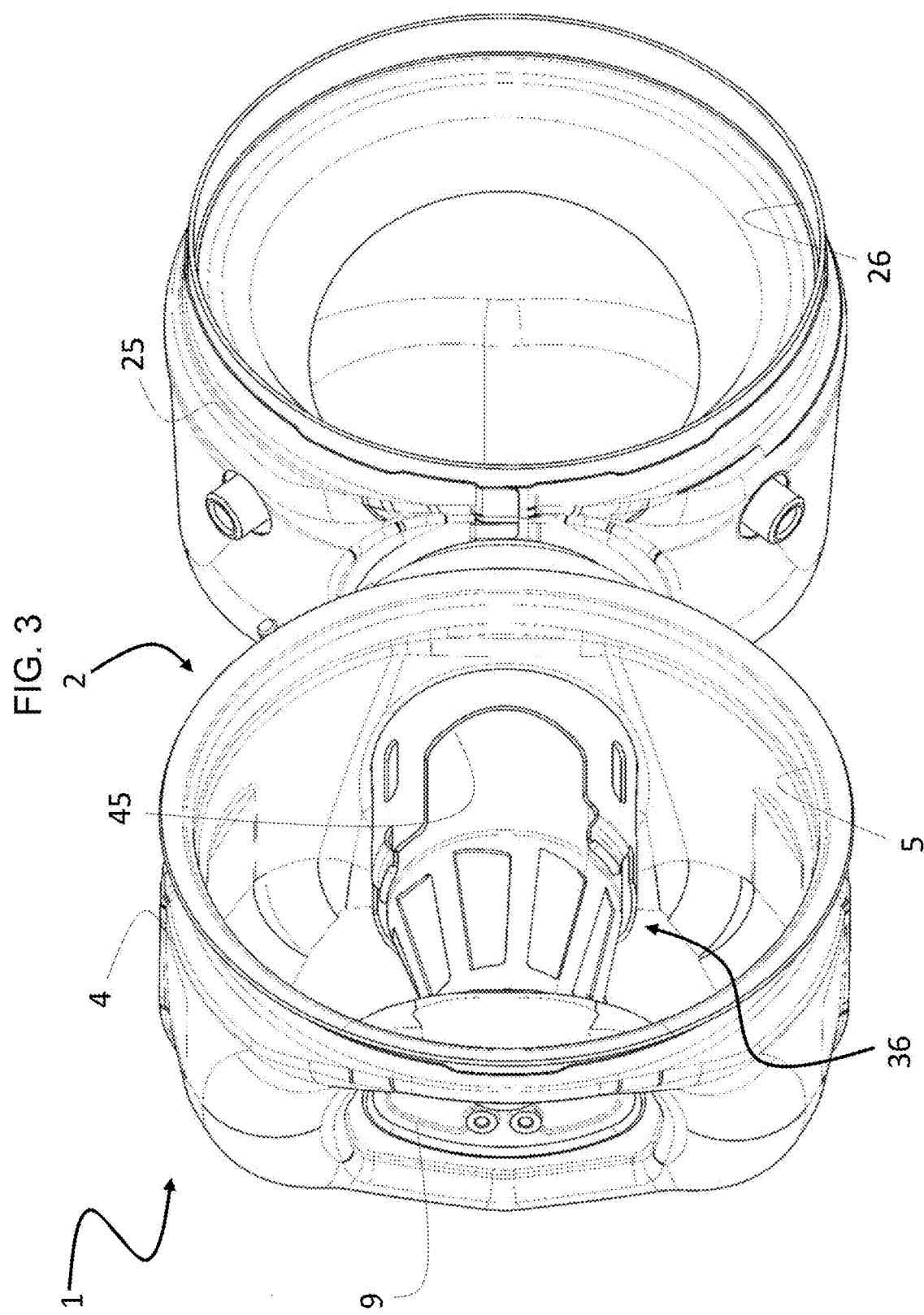
FIG. 3 shows a perspective view of the exhaust gas aftertreatment arrangement from FIG. 1 without injector.
Figure 4:
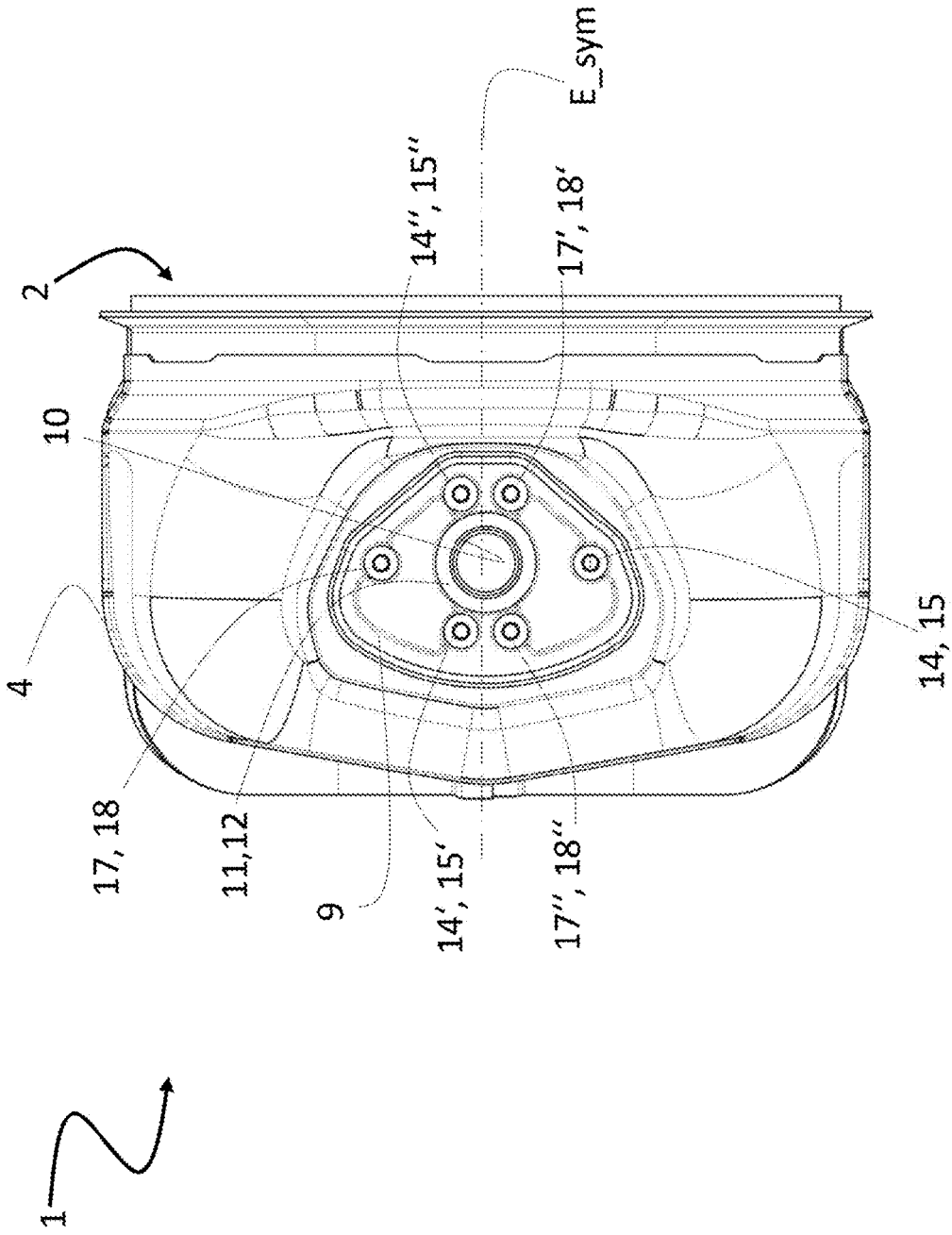
FIG. 4 shows a further side view of the exhaust gas aftertreatment arrangement from FIG. 1 in a first installation position without injector.
Figure 5:
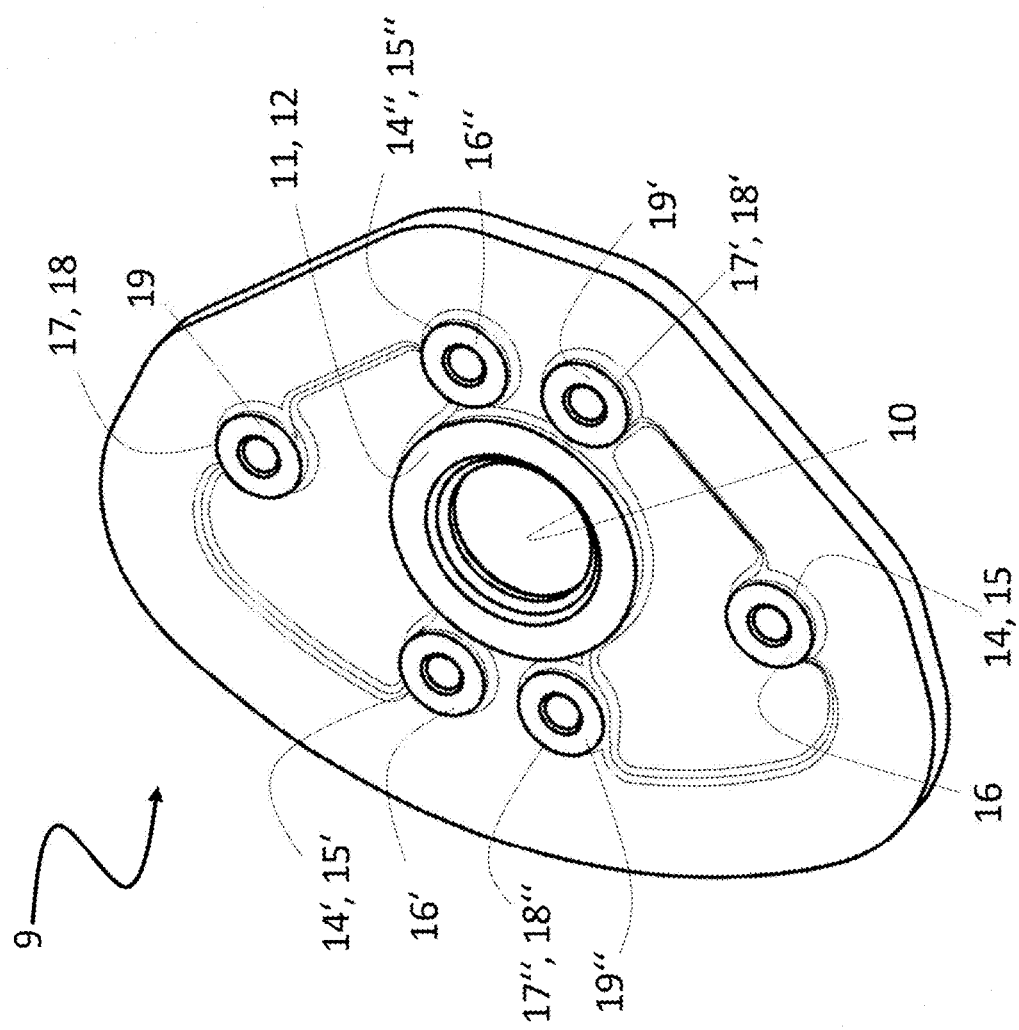
FIG. 5 shows a perspective view of the flange element from FIG. 1 from a first side.
Figure 6:
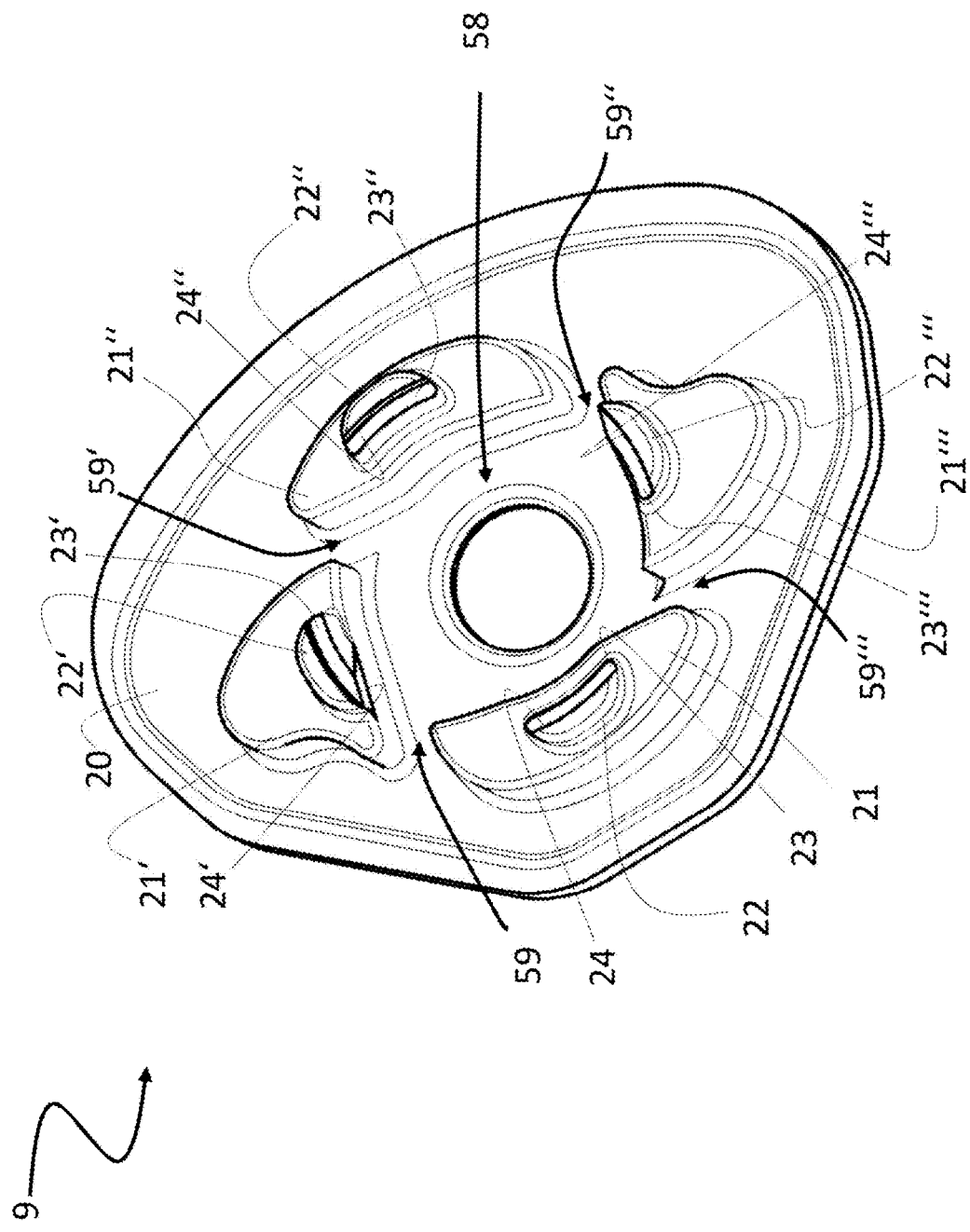
FIG. 6 shows a perspective view of the flange element from FIG. 1 from a second side.
Figure 7:
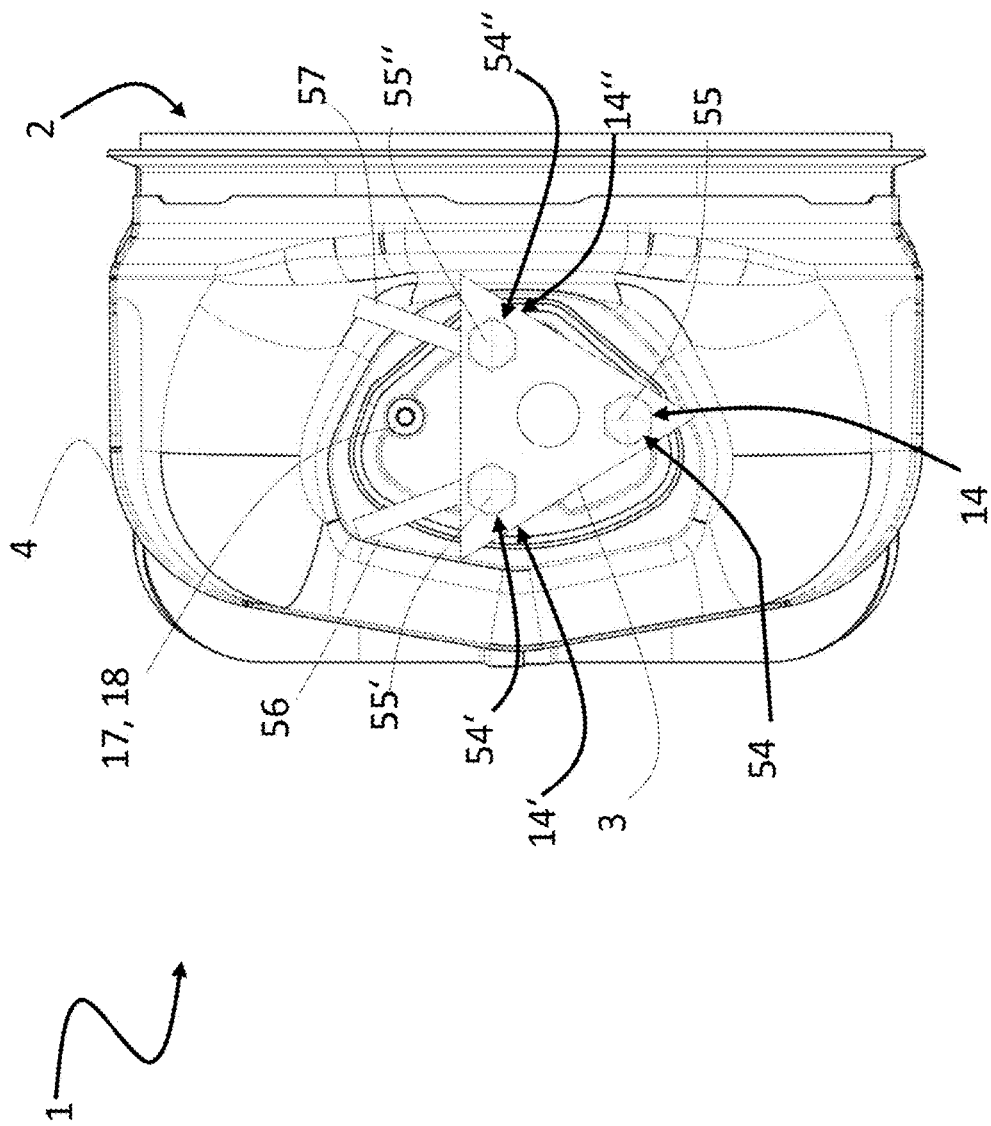

FIGS. 1 to 8, which are described together below, show a part of an exhaust gas aftertreatment arrangement 1 of an internal combustion engine with a mixer arrangement 2 for mixing an injection medium injectable by an injector 3 with the exhaust gas of the internal combustion engine in a first installation position. In the present case, a water-urea solution is injected into the exhaust gas through the injector 3 as an injection medium and mixed with it to reduce the nitrogen oxide content in the exhaust gas. The exhaust gas is then fed to a catalytic converter, not shown, in which the nitrogen oxides contained in the exhaust gas are converted into water and nitrogen by means of selective catalytic reduction.

The injector 3 is liquid-cooled. For this purpose, the injector 3 is supplied with coolant from a coolant source not shown via a partially shown coolant supply line 56. The coolant flows through the injector 3 and is then returned to the coolant source via a partially illustrated coolant drain 57.

The mixer arrangement 2 comprises a first exhaust gas guide section 4, which can also be referred to as the first exhaust gas guide element. The first exhaust gas guide section 4 is essentially cup-shaped and has a circular connection opening 5, via which the first exhaust gas guide section 4 can be fluidically connected to an upstream section of the exhaust gas aftertreatment arrangement 1, which is not shown. The upstream section of the exhaust gas aftertreatment system 1 can be a particulate filter, for example. The imaginary normal on the connection opening 5 defines the main inflow direction of the exhaust gas into the first exhaust gas guide section 4.

The first exhaust gas guide section 4 also comprises an insert opening 8, in which a flange element 9 is arranged. The first exhaust gas guide section 4 and the flange element 9 are firmly connected to each other, in particular welded. The flange element 9 comprises an injection opening 10, which extends along an injection axis L_10 and via which the injector 3 can inject the injection medium into the interior of the first exhaust gas guide section 4.

For this purpose, the injector 3 is permanently connected to the first exhaust gas guide section 4. For this purpose, the flange element 9 has a mounting arrangement with three first internal threads 14, 14', 14" on a side facing away from the interior of the first exhaust gas guide section 4, which together form a first threaded hole pattern. The first internal threads 14, 14', 14" can also be generally referred to as threaded holes. The three first internal threads 14, 14', 14" are each inserted into an internal threaded socket 15, 15', 15" and extend along a central axis.

The injector 3 has three mounting apertures 54, 54', 54", which together form a mounting hole pattern. The mounting apertures 54, 54', 54" are designed as cylindrical through-holes and can therefore also be referred to as mounting holes.

The first threaded hole pattern of the flange element 9 is complementary to the mounting hole pattern of the injector 3. Thus, the first threaded hole pattern and the mounting hole pattern can be brought into overlap with one another, so that a screw 55, 55', 55" extends through one of the three mounting apertures 54, 54', 54" into one of the three first internal threads 14, 14', 14" and engages therein. The injector is then clamped and frictionally connected to the flange element 9 via three screws 55, 55', 55". This positioning of the injector 3 is carried out in a first installation position of the exhaust gas aftertreatment arrangement 1 or the injector 3, which is shown, for example, in FIGS. 4 and 7. In the first installation position, the coolant supply line 56 and the coolant drain 57 of the injector 3 are directed vertically or geodetically upwards.

The flange element 9 also has three second internal threads 17, 17', 17", which together form a second threaded hole pattern. The three second internal threads 17, 17', 17" are each inserted into an internal threaded socket 18, 18', 18" and extend along a central axis. The second threaded hole pattern is rotationally symmetrical to the first threaded hole pattern with respect to the injection axis L_10. In the present case, the second threaded hole pattern is arranged offset by 180 degrees to the first threaded hole pattern with respect to the injection axis, without being limited to this. In the present case, the second threaded hole pattern is also arranged with mirror symmetry to the first threaded hole pattern with respect to a plane of symmetry E_sym, which comprises the injection axis L_10.

Figure 8:
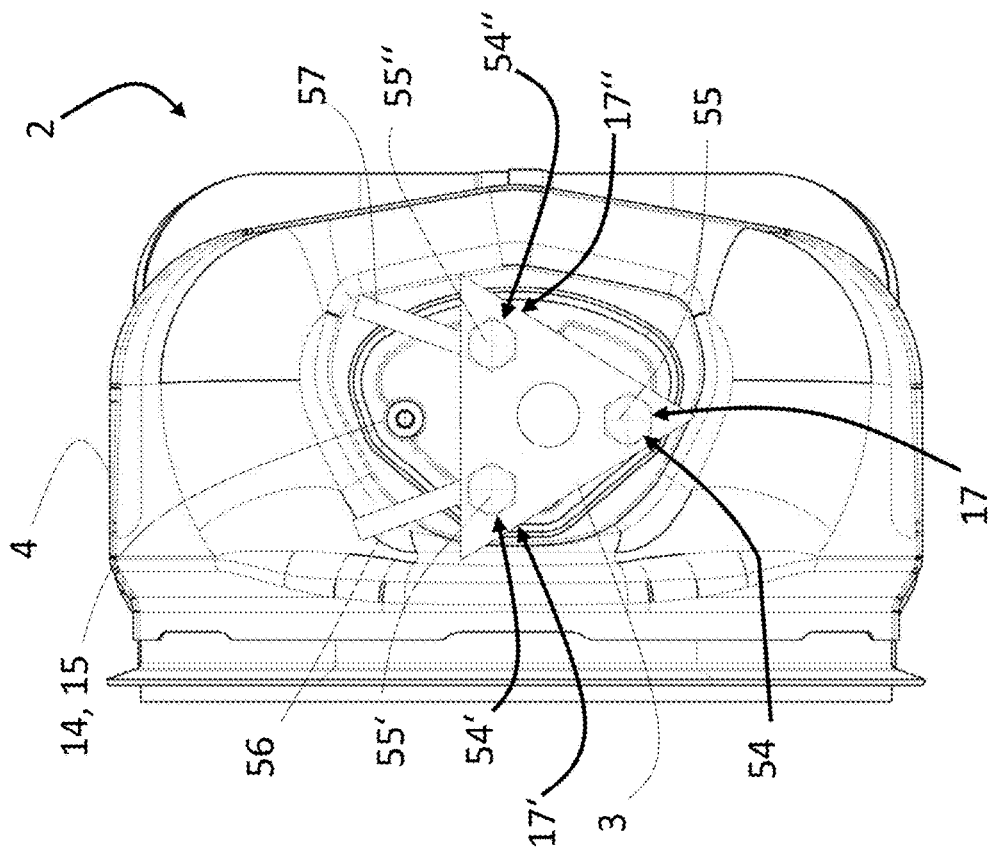
FIG. 8 shows a view analogous to FIG. 5 with the exhaust gas aftertreatment arrangement respectively the injector in a second installation position.

The second threaded hole pattern of the flange element 9 is also complementary to the mounting hole pattern of the injector 3. In this way, the second threaded hole pattern and the mounting hole pattern can be brought into overlap with one another so that a screw 55, 55', 55" extends through one of the three mounting apertures 54, 54', 54" into one of the three second internal threads 17, 17', 17" and engages therein. The injector 3 is then clamped and frictionally connected to the flange element 9 via the three screws 55, 55', 55". This positioning of the injector 3 is carried out in a second installation position of the exhaust gas aftertreatment system 1 or the injector, which is shown in FIG. 8, for example. In the second installation position, the exhaust gas aftertreatment arrangement 1 is rotated by 180 degrees around the injection axis L_10, without being limited to this. In fact, the exhaust gas aftertreatment arrangement 1 can be rotated from the first installation position to the second installation position by any angular amount around the injection axis L_10. It is understood that the rotation of the first threaded hole pattern to the second threaded hole pattern does not have to correspond exactly to the rotation of the exhaust gas aftertreatment arrangement 1 from the first installation position to the second installation position 1. In the second installation position, the coolant supply line 56 and the coolant outlet 57 of the injector 3 are also directed vertically or geodetically upwards.

The three first internal threads 14, 14', 14" and the three second internal threads 17, 17', 17" are each arranged radially outside the injection opening 10 with respect to the injection axis L_10.

The center axes of the three first internal threads 14, 14', 14" are each arranged in longitudinal planes in which the injection axis L_10 also lies. At least two of the three longitudinal planes, in which the center axes of the three first internal threads 14, 14', 14" are arranged, are arranged transversely to one another.

The center axes of the three first internal threads 14, 14', 14" delimit an imaginary first cylinder with a triangular base face. The injection axis L_10 is arranged inside the first imaginary cylinder.

The center axes of the three second internal threads 17, 17', 17" are each arranged in longitudinal planes in which the injection axis L_10 also lies. At least two of the three longitudinal planes, in which the central axes of the three second internal threads 17, 17', 17" are arranged, are arranged transversely to one another.

The center axes of the three second internal threads 17, 17', 17" delimit an imaginary second cylinder with a triangular base face. The injection axis L_10 is arranged inside the second imaginary cylinder.

The flange element 9 has bearing surfaces 16, 16', 16" at the axial ends of the internally threaded sockets 15, 15', 15" and support surfaces 19, 19', 19" at the axial ends of the internally threaded sockets 18, 18', 18", which are flat and lie in a common contact plane.

The flange element 9 has a central sealing shoulder 11 that surrounds the injection opening 10 in an annular shape. The sealing shoulder 11 has a sealing surface 12 at its axial end, which lies in the contact plane.

In the first installation position, the support surfaces 16, 16' 16" of the internally threaded sockets 15, 15', 15" together with the sealing surface 12 thus form a contact surface of the flange element 9, on which the injector 3 rests with a complementary contact surface.

In the second installation position, the support surfaces 19, 19', 19" of the internally threaded sockets 18, 18', 18" together with the sealing surface 12 form a contact surface of the flange element 9, on which the injector 3 rests with the complementary designed contact surface.

A mixing pipe 36, which extends along a longitudinal axis L_36, is arranged in the interior of the first exhaust gas guide section 4. The longitudinal axis L_36 is arranged transversely, in particular orthogonally, to the main inflow direction of the exhaust gas into the first exhaust gas guide section 4. The longitudinal axis L_36 is also arranged coaxially to the injection axis L_10. The mixing pipe 36 has an injection opening 37 at a first axial end, which is oriented in the direction of the injection opening 10 of the flange element 9. In other words, the injection opening 37 and the injection opening 10 are opposite each other. The injector 3 thus injects the injection medium into the mixing pipe 36.

The mixing pipe 36 comprises a swirl section 38, which is designed to swirl the exhaust gas flowing through it so that improved mixing of exhaust gas and injection medium can be achieved in the mixing pipe 36. The swirl section 38 extends from the injection opening 37 along the longitudinal axis L_36 and widens conically with increasing distance from the injection opening 37.

The first axial end of the mixing pipe 36 is supported on the exhaust gas guide section 4 via a support arrangement of the first exhaust gas guide section 4. The support arrangement of the first exhaust gas guide section 4 is integrated into the flange element 9. The flange element 9 has a base surface 20 on the side facing the interior of the first exhaust gas guide section 4. The base surface 20 is essentially flat. The injection opening 10 extends through the base surface 20.

Several projections 21 extend from the base surface 20 in the direction of the injection axis L_10. In the present case, four protrusions 21, 21', 21", 21' are provided. However, it is also conceivable that the support arrangement of the first exhaust gas guide section 4 comprises at least two projections. The multiple projections 21 are each spaced apart in a circumferential direction around the injection axis L_10. With respect to the injection axis L_10, the multiple projections 21 delimit an injection chamber 58 in the radial direction, which is fluidically connected to the injection opening 10. The injection chamber 58 is delimited in a direction parallel to the injection axis L_10 by the base surface 20. The injection medium injected by the injector 3 thus first flows through the injection opening 10 and then into the injection chamber 58. The injection medium injected by the injector 3 enters the mixing pipe 36 from the injection chamber 58.

A flow gap 59, 59', 59", 59' is formed between two successive protrusions of the plurality of projections 21 in the circumferential direction, which is delimited by the two successive protrusions and the base surface 20. The respective flow gap 59, 59', 59", 59' is open in a direction parallel to the injection axis L_10 away from the injection opening 10. The flow gaps 59, 59', 59", 59' connect the injection chamber 58 with the rest of the interior of the first exhaust gas guide section 4, so that exhaust gas can enter the injection chamber 58 from there. The flow gaps 59, 59', 59", 59' are designed and arranged around the injection axis L_10 in such a way that the exhaust gas enters the injection chamber 58 in a swirling movement around the injection axis L_10. In the injection chamber 58, the injection medium injected by the injector 3 is thus initially mixed with the exhaust gas from the internal combustion engine. The support arrangement of the first exhaust gas guide section 4 can therefore also be referred to as the first mixing arrangement or support mixing arrangement.

The four projections 21, 21', 21", 21' each comprise a support section 22, 22', 22", 22"', on which the first axial end of the mixing pipe 36 is supported in the axial direction and in the radial direction with respect to the injection axis L_10. The support sections 22, 22', 22", 22"' each have an axial contact surface 23, 23', 23", 23"', with which the first axial end of the mixing pipe 36 is in contact in a direction parallel to the injection axis L_10. The axial contact surfaces 23, 23', 23", 23"' are flat and lie in a common contact plane. The contact plane has a defined distance from the base surface 20 or from the injection opening 10. The axial distance of the mixing pipe 36 is thus precisely defined, which results in a constant effectiveness of the swirl section 38 of the mixing pipe 36 that is little affected by assembly deviations.

The support sections 22, 22', 22", 22' also each have a radial contact surface 24, 24', 24", 24"', which surrounds the first axial end of the mixing pipe 36 in sections. The radial contact surfaces 24, 24', 24", 24' face the injection axis L_10. The radial contact surfaces 24, 24', 24", 24" of the support sections 22, 22', 22", 22"' together surround the first axial end of the mixing pipe 36. It is conceivable that the first axial end of the mixing pipe 36 is in contact with the radial contact surfaces 24, 24', 24", 24". In this case, the mixing pipe 36 can, for example, be pressed in between the radial contact surfaces 24, 24', 24", 24". However, it is also conceivable that a clearance is provided between the radial contact surfaces 24, 24', 24", 24" and the first axial end of the mixing pipe 36.

In the area of the swirl section 38, the mixing pipe 36 has several inlet openings 39 distributed around the circumference, through which the exhaust gas from the internal combustion engine can enter the mixing pipe 36. In other words, the mixing pipe 36 is fluidically connected to the first exhaust gas guide section 4 via the inlet openings 39. The inlet openings 39 are each delimited in sections by a guide vane 40, which is shaped in such a way that the exhaust gas from the internal combustion engine enters the swirl section 38 with a swirl. The swirl section of the mixing pipe 36 can thus be referred to as the second mixing arrangement.

A cylinder section 41 adjoins the swirl section 38 in the direction of the longitudinal axis L_36 of the mixing pipe 36. The cylinder section 41 may also be referred to as mixing section. The cylinder section 41 comprises an outlet opening 42 of the mixing pipe 36 at its second axial end.

The cylinder section 41 extends through a passage opening 6 of the first exhaust gas guide section 4, which extends along a passage axis L_6. The passage axis L_6 of the passage opening 6 and the longitudinal axis L_36 of the mixing pipe are arranged coaxially to each other. The cylinder section 41 extends into a second exhaust gas guide section 25, which can also be referred to as the second exhaust gas guide element. The second exhaust gas guide section 25 is arranged downstream of the first exhaust gas guide section 4. The mixing pipe 36 thus fluidically connects the first exhaust gas guide section 4 with the second exhaust gas guide section 25.

The cylinder section 41 is surrounded in sections by a sleeve element 43, which extends along a longitudinal axis L_43. The longitudinal axis L_43 of the sleeve element 43 is arranged coaxially to the longitudinal axis L_36 of the mixing pipe 36. The sleeve element 43 also extends from the interior of the first exhaust gas guide section 4 through the passage opening 6 of the first exhaust gas guide section 4.

A gap 52 is formed between the sleeve element 43 and the mixing pipe 36. The gap 52 extends between an inlet opening 45 and an outlet opening 46, which are each formed between the mixing pipe 36 and the sleeve element 43. The gap 52 is fluidically connected to the first exhaust gas guide section 4 via the inlet opening 45. The gap 52 is fluidically connected to the second exhaust gas guide section 25 via the outlet opening 46. In principle, it is also conceivable that the gap 52 is optionally fluidically connected to the mixing pipe 36.

The gap 52 thus fluidically connects the first exhaust gas guide section 4 with the second exhaust gas guide section 25. The hot exhaust gas from the internal combustion engine can enter the gap 52 from the interior of the first exhaust gas guide section 4 via the inlet opening 45 and flow through it in the direction of the second exhaust gas guide section 25. The hot exhaust gas effectively transfers the thermal energy it contains to the mixing pipe 36 and heats it evenly. This prevents colder spots in the mixing pipe 36 where the injection medium can condense and subsequently deposit.

The mixer arrangement 2 comprises a second exhaust gas guide section 25, which can also be referred to as a second exhaust gas guide element. The second exhaust gas guide section 25 is essentially cup-shaped and has a circular connection opening 26, via which the second exhaust gas guide section 25 can be fluidically connected to a downstream section of the exhaust gas aftertreatment arrangement 1, which is not shown. The downstream section of the exhaust gas aftertreatment system 1 can be an SCR catalytic converter, for example.

The second exhaust gas guide section 25 has a passage opening 27, which extends along a passage axis L_27. The passage axis L_27 of the passage opening 27 and the longitudinal axis L_36 of the mixing pipe 36 are arranged coaxially to one another. A connecting pipe 28 extends along a longitudinal axis L28 through the passage opening 27 of the second exhaust gas guide section 25. The passage axis L_27 of the passage opening 27 and the longitudinal axis L_28 of the connecting pipe 28 are arranged coaxially to each other. The connecting pipe 28 extends from an interior of the second exhaust gas guide section 25 through the passage opening 27. The connecting pipe 28 has a cylindrical section 29 and an adjoining conical section 30, with the conical section forming an axial end of the connecting pipe 28. In the area of the passage opening 27, the cylinder section 29 of the connecting pipe 28 and the second exhaust gas guide section 25 are firmly connected to each other.

The connecting pipe 28 encloses the mixing pipe 36 and the sleeve element 43 at least partially. In other words, the respective axial end of the mixing pipe 36 or the sleeve element 43 arranged outside the interior of the first exhaust gas guide section 4 extends into the connecting pipe 28.

The connecting pipe 28 and the sleeve element 43 are detachably connected to each other by a connecting arrangement 32, so that the connecting pipe 28 and the sleeve element 43 are arranged in particular without contact to each other. The connecting arrangement 32 connects the connecting pipe 28 and the sleeve element 43 in an area outside the first exhaust gas guide section 4 and the second exhaust gas guide section 25.

The mixing pipe 36 is thus supported at its first axial end via the support arrangement and at or near the second axial end via the sleeve element 43 and the connecting arrangement 32 on the connecting pipe 28. This results in a defined position of the mixing pipe 36 with respect to the injection axis L_10, so that a permanently high efficiency of the mixing pipe 36 is ensured when mixing the injection medium.

A baffle plate 31 is arranged in the interior of the second exhaust gas guide section 25, which optimizes the flow of the exhaust gas.

LIST OF REFERENCE SIGNS

1 Exhaust aftertreatment arrangement
2 Mixer arrangement
3 Injector
4 First exhaust gas guide section
5 Connection opening
6 Passage opening
8 Insert opening
9 Flange element
10 Injection opening
11 Central sealing shoulder
12 Sealing surface
14 First thread
15 Threaded socket
16 Support surface
17 Second thread
18 Threaded socket
19 Support surface
Base surface
21 Projection
22 Support section
23 Axial contact surface
24 Radial contact surface
25 Second exhaust gas guide section/element
26 Connection opening
27 Passage opening 28 Connecting pipe
29 Cylinder section
30 Conical section
31 Baffle plate
32 Connection arrangement
36 Mixing pipe
37 Injection opening
38 Swirl section
39 Inlet opening
40 Guide vane
41 Cylinder section
42 Outlet opening
43 Sleeve element
45 Inlet opening
46 Outlet opening
52 Gap
54 Mounting aperture
55 Screw
56 Coolant supply line
57 Coolant drain
58 Injection chamber
59 Flow gap
L Axis

What is claimed is:

1. A mixer arrangement for mixing an injection medium with exhaust gas of an internal combustion engine, comprising:
an exhaust gas guide section with a plurality of first threaded holes together forming a first threaded hole pattern and a plurality of second threaded holes forming a second threaded hole pattern;
an injector configured for being attachable to the exhaust gas guide section and having a plurality of mounting apertures forming a mounting hole pattern;
wherein each of the first threaded hole pattern and the second threaded hole pattern is complementary to the mounting hole pattern,
wherein the number of the first threaded holes, the number of the second threaded holes and the number of mounting holes are the same; and
wherein the first threaded holes and the second threaded holes are configured such that the mounting apertures are alignable with the first threaded holes without being aligned with the second threaded holes and the mounting apertures are alignable with the second threaded holes without being aligned with the first threaded holes.

2. The mixer arrangement according to claim 1, wherein the exhaust gas guide section has an injection opening which extends along an injection axis and through which the injection medium can be injected from the injector into the exhaust gas guide section, and
wherein the second threaded hole pattern is arranged rotationally symmetrical to the first threaded hole pattern with respect to the injection axis.

3. The mixer arrangement according to claim 2, wherein the second threaded hole pattern is offset by 180 degrees to the first threaded hole pattern with respect to the injection axis.

4. The mixer arrangement according to claim 1,
wherein the injector is mounted to the exhaust gas guide section by means of a plurality of screws, each of the plurality of screws extends through a respective mounting aperture of the mounting apertures of the injector, and
wherein the plurality of screws each engage in one of the first threaded holes, or the plurality of screws each engage in one of the second threaded holes.

5. The mixer arrangement according to claim 4, wherein the exhaust gas guide section has an injection opening which extends along an injection axis and through which the injection medium can be injected from the injector into the exhaust gas guide section, and
wherein the second threaded hole pattern is arranged rotationally symmetrical to the first threaded hole pattern with respect to the injection axis,
wherein the first threaded holes and the second threaded holes are each arranged radially outside the injection opening with respect to the injection axis.

6. The mixer arrangement according to claim 5,
wherein center axes of the first threaded holes are each arranged in different longitudinal planes, which comprise the injection axis, and/or
wherein center axes of the second threaded holes are each arranged in different longitudinal planes, which comprise the injection axis.

7. The mixer arrangement according to claim 1,
wherein the injector has at least three mounting apertures, which together form the mounting hole pattern,
wherein the exhaust gas guide section has at least three first threaded holes, which together form the first threaded hole pattern, and
wherein the exhaust gas guide section has at least three second threaded holes, which together form the second threaded hole pattern.

8. The mixer arrangement according to claim 7,
wherein the exhaust gas guide section has an injection opening which extends along an injection axis and through which the injection medium can be injected from the injector into the exhaust gas guide section,
wherein the second threaded hole pattern is arranged rotationally symmetrical to the first threaded hole pattern with respect to the injection axis,
wherein center axes of the three first threaded holes delimit an imaginary first cylinder with a triangular base face,
wherein center axes of the three second threaded holes delimit an imaginary second cylinder with a triangular base face, and
wherein the injection axis is arranged in the imaginary first cylinder and/or in the imaginary second cylinder.

9. The mixer arrangement according to claim 1, wherein center axes of the first threaded holes define a first geometric pattern and center axes of the second threaded holes define a second geometric pattern, the first geometric pattern being spaced from the second geometric pattern in a non-overlapping manner.

* * * * *